April 30, 1935.    G. J. ASPEY    1,999,387
HACK SAW LIFT
Filed Aug. 22, 1932    3 Sheets-Sheet 1
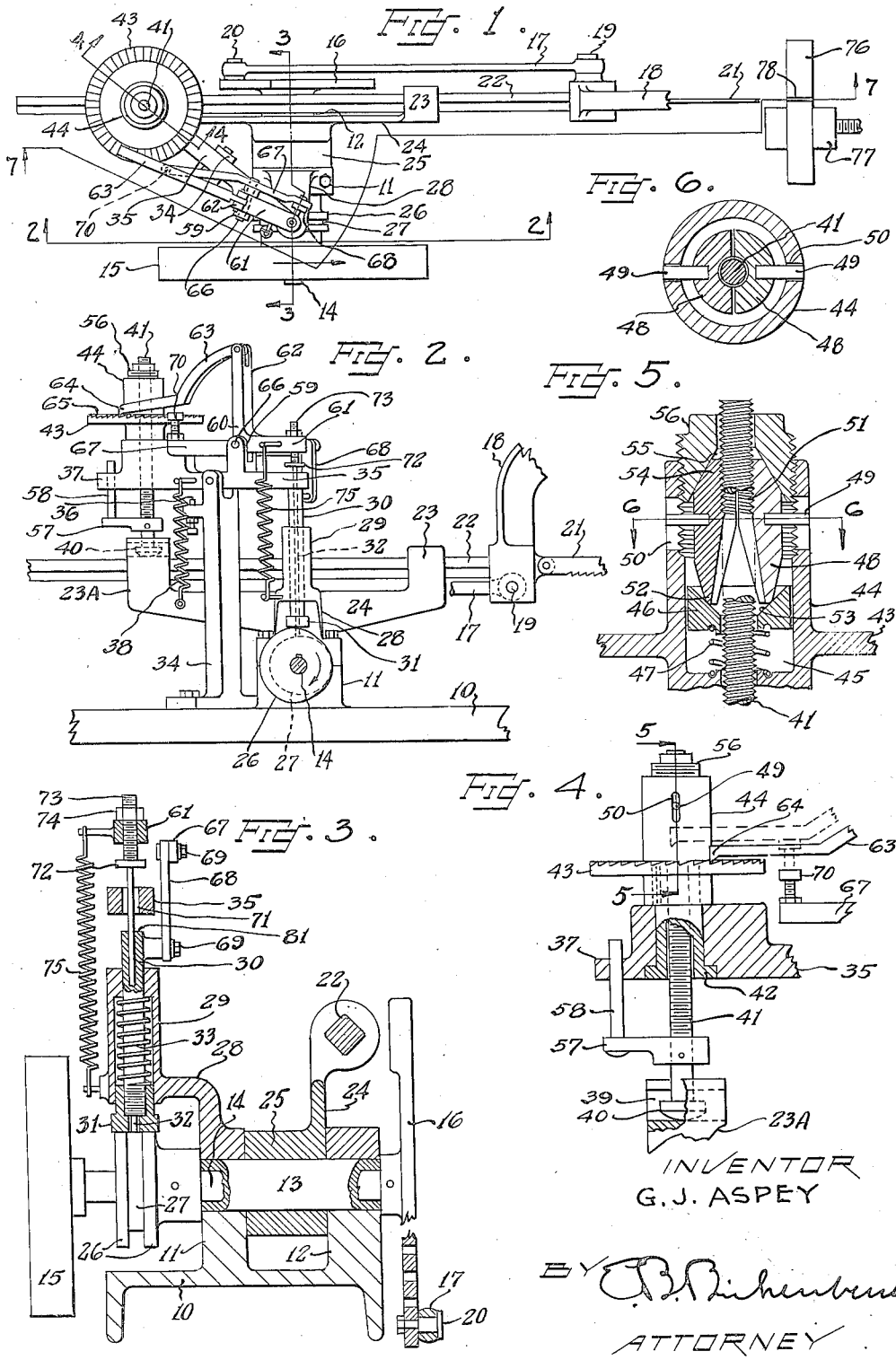
INVENTOR
G. J. ASPEY
BY
ATTORNEY

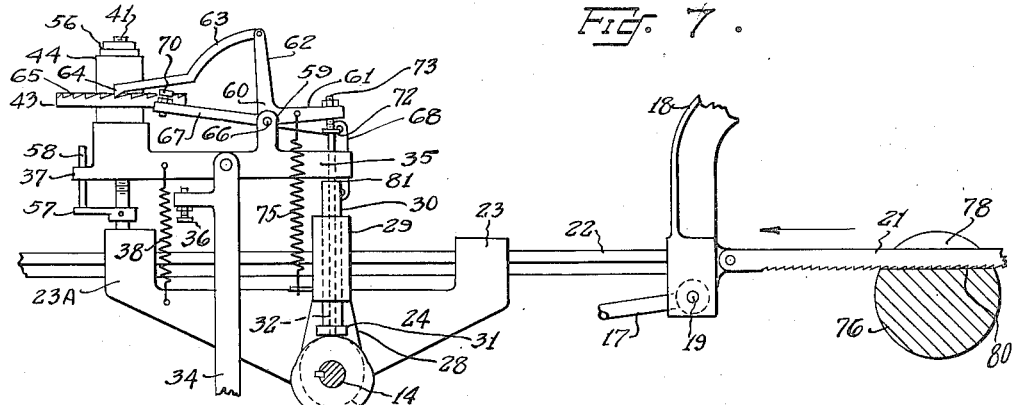
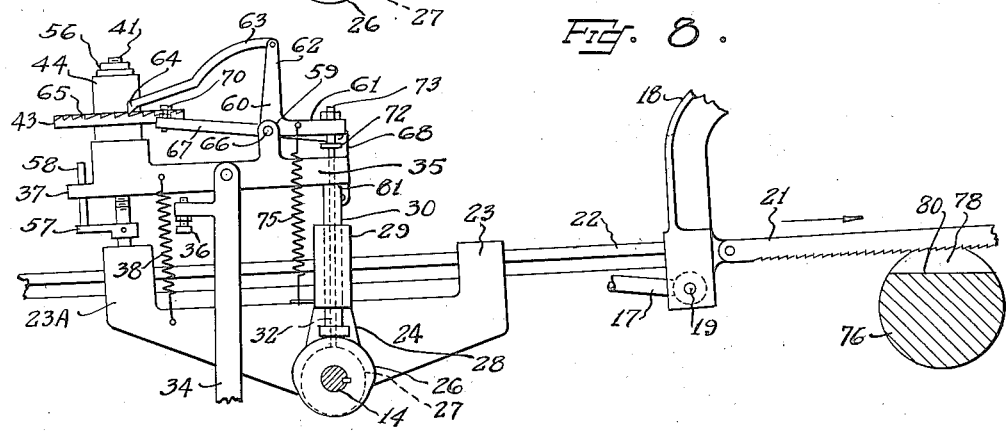
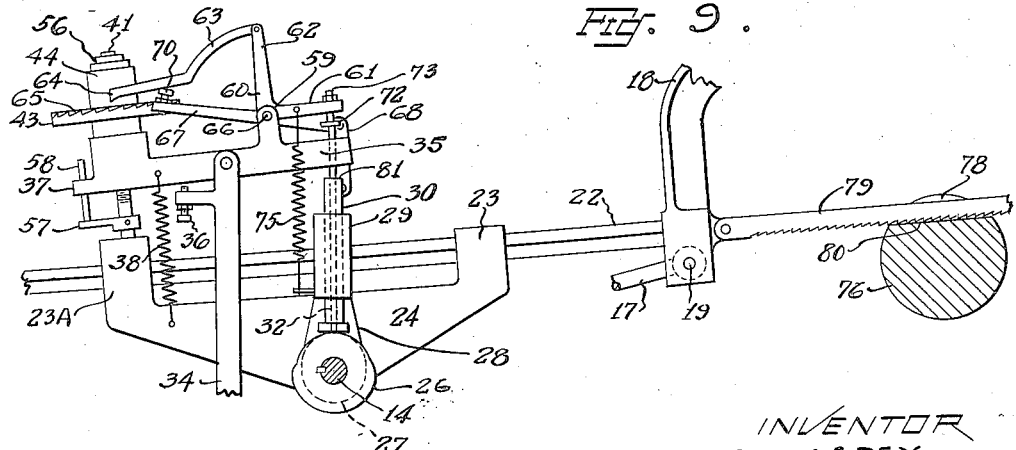

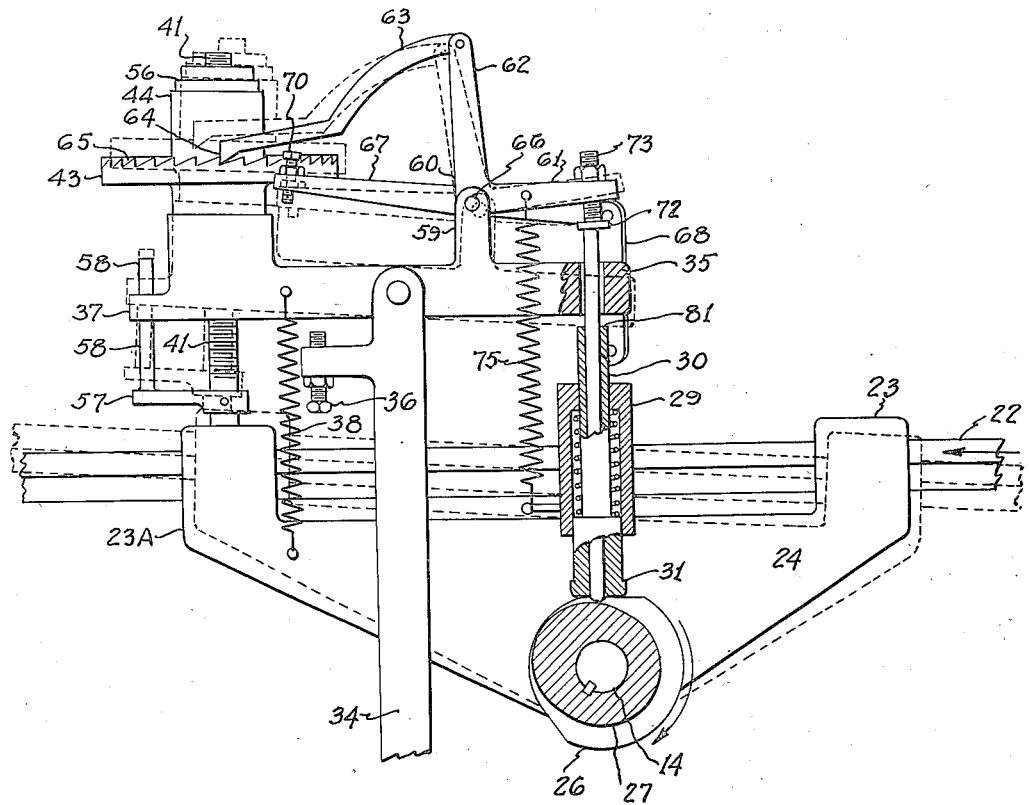

Patented Apr. 30, 1935

1,999,387

UNITED STATES PATENT OFFICE 1,999,387

HACK SAW LIFT

Gideon J. Aspey, Riddle, Oreg.

Application August 22, 1932, Serial No. 629,824

5 Claims. (Cl. 29—73)

This invention relates generally to power driven hack saws, and particularly to a lift therefor.

The main object of this invention is to provide a smooth acting hack saw lift.

The second object is to provide a hack saw lift which will furnish a uniform amount of clearance for the teeth on the back stroke and thereby reduce to a minimum the lifting action of the saw at each back stroke and a descending movement of the saw on the cutting stroke.

The third object is to provide a hack saw lift in which the feed can be entirely controlled by the speed of cutting.

The fourth object is to construct a hack saw whose cutting action will be satisfactory whether it be cutting through solid stock or through thin stock in sheet or tubular form, and regardless of its cross section.

These, and other objects, will become more apparent from the specification following as illustrated in the accompanying drawings, in which:

Fig. 1 is a plan view of the device showing same applied to a draw cut power hack saw.

Fig. 2 is a section along the line 2—2 in Fig. 1 showing parts in the position of beginning the outward stroke, namely when the saw is not cutting.

Fig. 3 is a section along the line 3—3 in Fig. 1 but showing the parts in the position during a cutting stroke.

Fig. 4 is a section taken along the line 4—4 in Fig. 1.

Fig. 5 is a section taken along the line 5—5 in Fig. 4.

Fig. 6 is a section taken along the line 6—6 in Fig. 5.

Fig. 7 is a fragmentary view taken along the line 7—7 in Fig. 1 during the cutting stroke.

Fig. 8 is a view similar to Fig. 7 but showing the return or outward stroke.

Fig. 9 is a view similar to Fig. 8 but showing an inoperative position in which the saw is cutting very little or none at all.

Fig. 10 is a view similar to Fig. 9 in which the positions of the parts at the start of the cutting stroke are shown in full lines, while the positions of the parts at the completion of the cutting stroke are shown in dotted lines.

Similar numbers of reference refer to similar parts throughout the several views.

Referring in detail to the drawings, there is illustrated a base 10 on which are formed the upright standards 11 and 12 across which is mounted a tubular bushing 13 within which journals a cam shaft 14 on one end of which is a drive pulley 15, and on the other end of which is a crank 16 whose connecting rod 17 is joined to the saw frame 18 and the crank 16 by means of the screws 19 and 20. The saw frame 18 carries a hack saw blade 21. The frame 18 is supported by a square slide 22 which is mounted in the spaced saw guides 23 and 23—A, which are integral with the base 24 whose lowermost portion 25 is rockably mounted on the bushing 13.

On the cam shaft 14 are also the clearance cams 26 and the intermediate feed cam 27.

Rising from the standard 11 is a bracket 28 which supports an upright tubular housing 29 in which is mounted a vertical plunger 30 on whose lower end is secured a perforated nut 31 which is slidable within the lower end of the housing 29. Passing through the plunger 30 is a rod 32 whose lower end rests upon the feed cam 27. A spring 33 is placed within the upper end of the nut 31 and the inside of the upper end of the housing 29. The function of this spring is to urge the nut 31 downwardly toward the clearance cams 26 independently of the rod 32.

Mounted on the base 10 is a stationary rocker arm post 34 across whose upper end is mounted the main rocker arm 35. The post 34 is provided with a set screw 36 adapted to serve as an adjustable stop for the rocking action of the arm 35. The end 37 of the rocker arm 35 is urged toward the guide 23—A by means of a tension spring 38 which is attached between the end 37 and the saw guide 23—A.

The upper end of the guide 23—A is provided with a T slot 39 in which is disposed the head 40 of a screw 41. The screw 41 passes freely through a bushing 42 in the rocker arm end 37. The bushing 42 is rotatable with relation to the end 37 and carries on its upper end a ratchet wheel 43. On the top side of the ratchet wheel 43 is formed a hollow hub 44 in whose recess 45 is placed a cone 46 which is urged upwardly by a spring 47. Above the cone 46 is placed a split nut consisting of a pair of tapered jaws 48 which are prevented from rotating by means of the pins 49 which project into the slots 50 of the hub 44. The upper end of the jaws 48 is provided with an internal thread 51 which matches the thread of the screw 41. The lower end 52 of each jaw 48 engages the tapering face 53 of the cone 46, and the upper end 54 of each jaw 48 engages the conical recess 55 of the threaded cap 56 which screws into the upper end of the hub 44.

The purpose of the mechanism within the hub 44 is merely to expedite the raising of the saw out of the cut, as will be more fully explained later.

On the screw 41 is secured an arm 57 which is provided with an upright pin 58 which passes slidably through the end 37. The purpose of the pin 58 is merely to prevent the rotation of the screw 41.

On the main rocker arm 35 is an upright standard 59 on which is mounted a bell crank lever 60 having an approximately horizontal portion 61 and an upright portion 62. To the upright portion 62 is hinged an elongated pawl 63 whose point 64 engages the teeth 65 of the ratchet wheel 43. The lever 63 rocks on a pin 66 on which is separately pivoted an auxiliary rocker arm 67 one end of which is connected by a link 68 to the plunger 30 by means of the screws 69. The opposite end of the auxiliary arm 67 is provided with a screw 70 which forms an adjustable stop for the pawl 63.

The rod 32 passes through an opening 71 in the rocker arm 35 and engages the head 72 of an adjusting screw 73 which is locked in position on the horizontal portion 61 of the bell crank lever 60 by means of a nut 74. The portion 61 of the bell crank lever 60 is urged downwardly by means of a spring 75 whose lower end is anchored to the housing 29.

In order to illustrate the invention there is shown a piece of round bar stock 76 which is being held in a vise 77. The saw cut 78 is also indicated. In Fig. 9 it is assumed that the saw 79 is dull, or that the cut is progressing slowly, either due to the character of the metal being cut, its cross section, or other factor, while in the other views it is assumed that the saw is in proper condition and that the cutting action thereof is normal.

Before entering into a description of the operation of this invention it will be understood that in the hack saws now on the market the clearance provided for the return stroke of the saw is not measured from the bottom 80 of the cut 78, but the saw is lifted to a fixed point at each return stroke, requiring, therefore, a greater ascending and descending movement of the saw at each stroke than is required by my device in which the saw blade is lifted only the required distance for its teeth to clear the bottom 80 of the cut being made.

The operation of the device is as follows: Assuming that the work 76 is suitably held in the vise 77 and that the proper saw blade 21 is in position and the pulley 15 being rotated by a suitable source of power (not shown) it will be seen that the rotation of the shaft 14 through the crank 16 will cause the saw frame 18 to reciprocate in the saw guides 23 and 23—A. The base 24, which supports the guides 23 and 23—A, is rockably mounted on the bushing 13 and in the absence of any other mechanism the blade 21 would remain at the bottom of the cut; however the clearance cams 26 rotate with the shaft 14 and, at the completion of the cutting stroke, the high part of each cam 26 lifts the nut 31 and its attached plunger 30 a fixed distance, causing the plunger 30 to rise and its upper end 31 to engage the under side of the perforated end of the rocker arm 35 causing it to tip (as shown in Fig. 3) and thereby exert a downward pressure on the saw guide 23—A during the return stroke, and of course holding the teeth of the blade 21 out of a cutting position.

While the saw blade 21 is again moving in a cutting direction the feed cam 27 raises the rod 32 which operates the bell crank lever 60 and consequently, through the pawl 63, turns the ratchet wheel 43 which increases the distance between the plunger 30 and the under side of the rocker arm 35. In other words, after each stroke when the saw has descended to a new low level it is elevated a distance, which is measured from this new low level—that is to say, at each backward stroke of the saw it is raised to a lower elevation than it was the previous backward stroke, that is, only enough to provide the desired clearance for the saw teeth, and the faster the saw cuts the faster will be the follow-up of the clearance mechanism. In other words if it is decided that the saw teeth should clear the bottom 80 of the cut 78 by one sixteenth of an inch during the first return stroke and is adjusted accordingly, this clearance will be maintained on all subsequent backward strokes of the saw 21.

For example, the first stroke performed in the cutting off of a piece of round stock will produce a cut of a depth far in excess of what would be produced by a similar cut performed near the diameter of the stock, then the more the blade 21 descends at each working stroke the more the guide 23—A rises during the same time and, due to the relationship between the rocker arm 35 and the bell crank lever 60 and associated parts, the greater the upward movement of the guide 23—A the greater will be the rotation of the ratchet wheel 43 within the limit imposed by the stop 81. In other words, there is established and maintained a fixed clearance for the backward movement of the saw teeth, regardless of the cutting speed of the saw.

If it is desired to limit still more the follow-up action this is accomplished by means of the adjusting screw 70 which will decrease the period of operative engagement between the pawl 63 and the ratchet wheel 43 for a given movement of the bell crank lever 60. After the cut is completed or if at any time it is desired to raise the blade 21 out of the cut, this is accomplished by merely lifting the frame 18 manually which will permit the screw 41 to slip between the jaws 48, the movement of the rocker arm being resisted by the screw 36.

From the foregoing it may be seen that there is provided a hack saw lift whose cutting action can be definitely controlled, since if this cutting speed exceeds a pre-determined maximum its cutting rate will be reduced, due to the greater period of contact between the plunger 30 and the arm 35, and during the return portion of the cycle the clearance is definitely maintained, always with relation to the bottom of the cut instead of the point at which the cut was started, as is commonly the case.

It will be noted that the two sets of cams 26 and 27, while seemingly different in purpose, are actually intimately related to each other, the clearance cams 26 providing the lifting action for the blade on the return stroke, while the feed cam 27 determines the height which the blade is lifted above the bottom of the cut and, due to the interconnection of the parts 35, 60 and 67, the regulating movement is additive to the normal lifting action so that if no cut is formed by the saw there will be no decrease in the clearance, since the pawl 63 will be held out of an operative position by the screw 70.

Conversely, if the saw is operating without any material 76 it will feed downwardly through space at a rate determined by the positions of the screws 70 and 72 and by the time each cutting stroke is finished the ratchet wheel 43, through the pawl 63 and bell crank lever 60, will, through the action of the feed cam 27 and the pin 32 in combination with the movement of the pivot center 66, move the arm 37 toward the guide 23—A—that is, increasing the distance between the stop 81 and the arm 35 to what it was at the commencement of the previous cut.

It will be seen that when the clearance cam 26 raises the plunger 30 during a return stroke of the saw 21 it not only raises the saw by contacting the plunger end 81 and the part 35, but also, by means of the link 68, rocks the auxiliary rocker arm 67 and permits the pawl point 64 to engage the ratchet wheel 43 for the purpose of rotating same during the next cutting stroke of the saw 21. The pawl point 64 is rendered inoperative by the clearance cam 26 during a cutting stroke whenever the saw is unable to cut as fast as the speed for which it is set, as in Fig. 9. In other words, the arm 67 limits the clearance and the end 81 of the plunger 30 limits the rate of cutting. Naturally, these parts do not accomplish the above-mentioned results alone but only in conjunction with other related parts. To re-state the entire matter, the saw 21 always operates within two limits, namely between a predetermined elevation above the bottom of the saw cut as a maximum elevation and the depth resulting from a single cutting stroke measured downwardly from said maximum elevation.

I claim:

1. A lift for hack saws consisting of a frame, a horizontal drive shaft mounted in said frame having a crank at one end and a drive pulley at the opposite end thereof, said shaft also having a clearance cam and a feed cam mounted thereon, a rockable guide mounted on said frame on the axis of said shaft, a housing on said frame having an upright plunger therein actuated by said clearance cam, a rod slidably mounted along the axis of said plunger and actuated by said feed cam, a rocker arm post mounted on said frame, a main rocker arm mounted on said post having one end thereof above said plunger, said rod projecting loosely through said last mentioned portion of the rocker arm, a bell crank lever mounted on said rocker arm having a horizontal portion resting upon the upper end of said rod, spring means for urging said horizontal portion of the lever downwardly, a screw connection between the opposite end of said main rocker arm and the portion of said guide below same, a ratchet nut on said screw, a ratchet wheel for rotating said nut, a pawl actuated by said bell crank lever, and an adjustable stop for said pawl actuated from said plunger whereby a sub-normal cut formed by said saw will diminish the rotation of said ratchet wheel and the corresponding lowering action of said saw.

2. A hack saw lift consisting of a rocker arm post, a main rocker arm mounted on said post, a clearance cam adapted to provide a lifting action for one end of said rocker arm during a return stroke of the saw, a ratchet-operated screw feed carried by said rocker arm adapted to change the relationship between said clearance cam and rocker arm, a pawl for operating said ratchet feed, a feed cam for actuating said pawl, and means operated by said clearance cam for controlling the action of said pawl on said ratchet feed whereby a fixed clearance will be maintained between the cutting teeth and the bottom of the cut on the return strokes throughout the cutting operation.

3. A hack saw lift having in combination a slide upon which a saw can be mounted, a rockable guide for said slide, a main rocker arm mounted over said rockable guide, a cam adapted to provide a lifting action during the return stroke of the saw, said lifting action being exerted under one end of said main rocker arm, the opposite end of said rocker arm having a screw depending therefrom engaging one end of said rockable guide, a nut for said screw, a ratchet wheel for rotating said nut, a pawl engaging said ratchet, and means operable by said cam for actuating said pawl for the purpose of rotating said ratchet wheel in a direction which will permit the saw-holding end of said slide to descend a distance substantially equal to the cut formed by the previous stroke of the saw.

4. The substance of claim 3, together with means for varying the action of said pawl upon said ratchet wheel.

5. The substance of claim 3, and a yieldable connection between said nut and screw whereby the saw end of said slide may be raised manually out of the cut, together with stop means on the support of said main rocker arm for limiting the movement thereof while said screw is being drawn through said nut.

GIDEON J. ASPEY.